(12) United States Patent
Nishikawa

(10) Patent No.: US 11,670,204 B2
(45) Date of Patent: Jun. 6, 2023

(54) RESIDUAL DC MEASUREMENT DEVICE, RESIDUAL DC MEASUREMENT METHOD, AND RESIDUAL DC MEASUREMENT PROGRAM

(71) Applicant: Konica Minolta, Inc., Tokyo (JP)

(72) Inventor: Yoshihiro Nishikawa, Kobe (JP)

(73) Assignee: Konica Minolta, Inc., Tokyo (JP)

( * ) Notice: Subject to any disclaimer, the term of this patent is extended or adjusted under 35 U.S.C. 154(b) by 24 days.

(21) Appl. No.: 17/432,663

(22) PCT Filed: Jan. 22, 2020

(86) PCT No.: PCT/JP2020/002048
§ 371 (c)(1),
(2) Date: Aug. 20, 2021

(87) PCT Pub. No.: WO2020/183921
PCT Pub. Date: Sep. 17, 2020

(65) Prior Publication Data
US 2022/0189354 A1   Jun. 16, 2022

(30) Foreign Application Priority Data
Mar. 13, 2019 (JP) .............................. JP2019-045577

(51) Int. Cl.
*G09G 3/00* (2006.01)
*G02F 1/13* (2006.01)

(52) U.S. Cl.
CPC ............ *G09G 3/006* (2013.01); *G02F 1/1309* (2013.01); *G09G 2320/0247* (2013.01); *G09G 2320/046* (2013.01)

(58) Field of Classification Search
CPC ........... G09G 3/006; G09G 2320/0247; G09G 2320/046; G09G 3/36; G09G 2320/0204; G02F 1/1309; H04N 17/04
See application file for complete search history.

(56) References Cited

U.S. PATENT DOCUMENTS

| 2010/0073341 A1* | 3/2010 | Toyooka | G09G 3/3655 345/55 |
| 2016/0140890 A1* | 5/2016 | Kim | G09G 3/3614 345/89 |

(Continued)

OTHER PUBLICATIONS

Nakazono et al., "Evaluation of residual DC of LC cell", 5th Asian Symposium on Information Display, ASID'99, 1999, p. 51-54; Cited in Specification.

(Continued)

*Primary Examiner* — Akm Zakaria
(74) *Attorney, Agent, or Firm* — Rankin, Hill & Clark LLP

(57) ABSTRACT

A residual DC measurement device of the present invention receives light emitted from a display device and outputs a light reception signal, measures a flicker value of the display device on the basis of the light reception signal output while the flicker measurement image is displayed by the display device and stores the flicker value in a storage as an initial flicker value, subsequently causes the display device to display a predetermined display image for a predetermined display time, causes the display device to display the flicker measurement image again when the predetermined display time elapses, measures the flicker value of the display device on the basis of the light reception signal output while the flicker measurement image is displayed and stores the flicker value in the storage as a posterior flicker value, and calculates a flicker change amount by calculating the posterior flicker value stored in the storage and the initial flicker value as an index value representing the residual DC.

19 Claims, 6 Drawing Sheets

(56) References Cited

U.S. PATENT DOCUMENTS

2016/0365025 A1* 12/2016 Ding ...................... G09G 3/006
2020/0105198 A1* 4/2020 Park ..................... G09G 3/3275
2021/0335296 A1* 10/2021 Wang ................... H04N 1/4015

OTHER PUBLICATIONS

Inoue et al., "Correlation between Flicker Minimizing Method and Dielectric Absorption Method for Residual DC Voltage Measurement", the Liquid Crystal Symposium, The Japan Liquid Crystal Society, 1997, 23 (0), pp. 216-217; Cited in Specification.

Park et al., "Analysis of IPS Mura, Image-Sticking and Flicker Caused by Internal DC Effects", SID 03 DIGEST, 2003, pp. 204-207, total 5 pages; Cited in Specification.

International Search Report (ISR) dated Apr. 14, 2020 filed in PCT/JP2020/002048.

* cited by examiner

FIG. 6

| MEASUREMENT POSITION | F(x1,y1) | F(x3,y1) | F(x2,y2) | F(x1,y3) | F(x3,y3) | AVERAGE VALUE | MAXIMUM VALUE | MINIMUM VALUE | VARIATION VALUE |
|---|---|---|---|---|---|---|---|---|---|
| INITIAL FLICKER VALUE [dB] | −47 | −46 | −48 | −48 | −47 | — | — | — | — |
| POSTERIOR FLICKER VALUE [dB] | −31 | −40 | −43 | −25 | −15 | — | — | — | — |
| RESIDUAL DC FLICKER AMOUNT [dB] | 16 | 6 | 5 | 22 | 32 | 16 | 32 | 5 | 27 |

RESIDUAL DC MEASUREMENT DEVICE, RESIDUAL DC MEASUREMENT METHOD, AND RESIDUAL DC MEASUREMENT PROGRAM

TECHNICAL FIELD

The present invention relates to a technology for measuring residual DC generated in a display device such as a liquid crystal display.

BACKGROUND ART

In a liquid crystal display, it is known that image persistence occurs when the same image is displayed for a long time (see, for example, Non-Patent Literature 1). Non-Patent Literature 1 describes that this image persistence is strongly related to residual DC. As a method for measuring a residual DC voltage, a flicker elimination method is known (see, for example, Non-Patent Literature 2). The flicker elimination method is generally a method in which stress (temperature, heat) is applied to a liquid crystal panel, and then a symmetric AC signal is applied to measure a bias voltage to be applied in order to eliminate the generated flicker. However, Non-Patent Literature 2 reports a problem that since it is difficult to automate measurement by the flicker elimination method, measurement results may differ depending on a measurer. Non-Patent Literature 3 describes a temporal change of a flicker value after applying different DC voltage stresses to a sample. That is, Fig. 11 of Non-Patent Literature 3 illustrates that the flicker amount changes over time.

In recent years, fringe field switching type liquid crystal is widely used as a means for achieving a high-performance liquid crystal display having a wide viewing angle and high resolution. However, since this liquid crystal material has a large residual DC, there is a problem that image persistence is likely to occur. Therefore, there is an increasing need to measure the residual DC.

However, in order to apply the bias voltage to a liquid crystal cell for the purpose of measuring the residual DC, it is necessary to disassemble the liquid crystal display and connect a wiring to the liquid crystal cell. Therefore, for the liquid crystal display of which assembly is almost completed, for example, if it is attempted to check the residual DC in an inspection process, the bias voltage cannot be applied to the liquid crystal cells, and thus the flicker elimination method cannot be used. Similarly, for the liquid crystal display of which assembly is almost completed, it is not possible to examine the difference in flicker value by applying different DC voltages to the liquid crystal cells as in Non-Patent Literature 3. Accordingly, it is desired that the residual DC can be measured also for a display device such as a liquid crystal display that has been almost completely assembled in a factory.

CITATION LIST

Non-Patent Literature

Non-Patent Literature 1: Yuji Nakazono, etc. "Evaluation of residual DC of LC cell", Proceedings of 5th Asian Symposium on Information Display, ASID '99, 1999, pp. 51 to 54

Non-Patent Literature 2: Masaru Inoue et al., "Residual DC Voltage Measurement by Dielectric Absorption Method (Correlation with Flicker Erasure Method)", Proceedings of the Liquid Crystal Symposium, The Japan Liquid Crystal Society, 1997, 23 (0), pp. 216 to 217

Non-Patent Literature 3: H. J. Park, etc. "Analysis of IPS Mura, Image-Sticking and Flicker Caused by Internal DC Effects", (US), SID 03 DIGEST, 2003, pp. 204 to 207

SUMMARY OF INVENTION

The present invention has been made in view of the above circumstances, and has an object to provide a residual DC measurement device, a residual DC measurement method, and a residual DC measurement program capable of easily measuring a value correlated with residual DC even in a display device to which a wiring line cannot be connected without being disassembled.

In order to achieve the above object, a residual DC measurement device reflecting one aspect of the present invention receives light emitted from a display device and outputs a light reception signal corresponding to an amount of received light, causes the display device to display a flicker measurement image, acquires the light reception signal output while the flicker measurement image is displayed, measures a flicker value of the display device on the basis of the acquired light reception signal and stores the flicker value in the storage as an initial flicker value, subsequently causes the display device to display a predetermined display image for a predetermined display time, causes the display device to display the flicker measurement image again when the predetermined display time elapses, acquires the light reception signal output while the flicker measurement image is displayed, measures the flicker value of the display device on the basis of the acquired light reception signal and stores the flicker value in the storage as a posterior flicker value, and calculates a flicker change amount by calculating the posterior flicker value and the initial flicker value stored in the storage as an index value representing the residual DC.

The advantages and features provided by one or more embodiments of the invention are fully understood from the detailed description and accompanying drawings provided below. These detailed descriptions and accompanying drawings are given by way of example only and are not intended as a limited definition of the present invention.

BRIEF DESCRIPTION OF DRAWINGS

FIG. 6 is a diagram illustrating a flicker value and so on in FIG. 5 in a tabular form by the measurement positions.

DESCRIPTION OF EMBODIMENTS

Knowledge Underlying Present Invention

Figure 8:
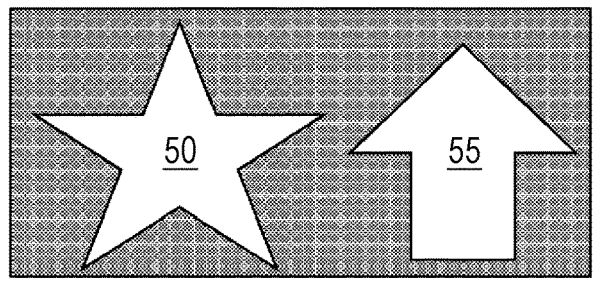
FIG. 8 is a diagram schematically illustrating an example of a fatigue pattern displayed on a liquid crystal display.
Figure 9:
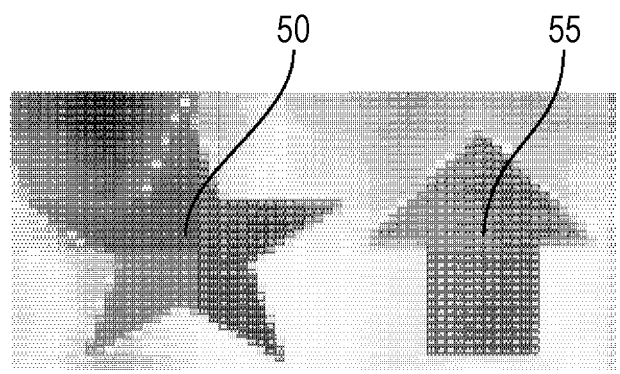
FIG. 9 is a diagram schematically illustrating an example of a spatial distribution of flicker values measured after the fatigue pattern of FIG. 8 is displayed.

FIG. 8 is a diagram schematically illustrating an example of a fatigue pattern displayed on a liquid crystal display. FIG. 9 is a diagram schematically illustrating an example of a spatial distribution of flicker values measured after the fatigue pattern of FIG. 8 is displayed. The knowledge on which the present invention is based will be described with reference to FIGS. 8 and 9.

In FIG. 8, a fatigue pattern including a star-shaped white region 50 and an arrow-shaped white region 55 in the black region of the background is displayed on the liquid crystal display. It is known that when a fatigue pattern as illustrated in FIG. 8 is displayed on the liquid crystal display for a long time, and subsequently a checkered pattern for flicker measurement is displayed to measure flicker, flicker values of the white regions 50 and 55 in which the fatigue pattern is displayed for a long time become larger than flicker values of other regions due to the residual DC as illustrated in FIG. 9.

A flicker value can be measured by receiving light emitted from a display device such as a liquid crystal display. Thus, it is possible to measure the flicker value for the display device of the finished product. Accordingly, the present inventor has focused on the flicker value, and conceived the present invention by considering that an index value representing the residual DC can be obtained on the basis of the flicker value.

Embodiment

Hereinafter, embodiments of the present invention will be described with reference to the drawings. Note that in the drawings, the same reference numerals are used for the same components, and the detailed description thereof will be omitted as appropriate.

Figure 1:
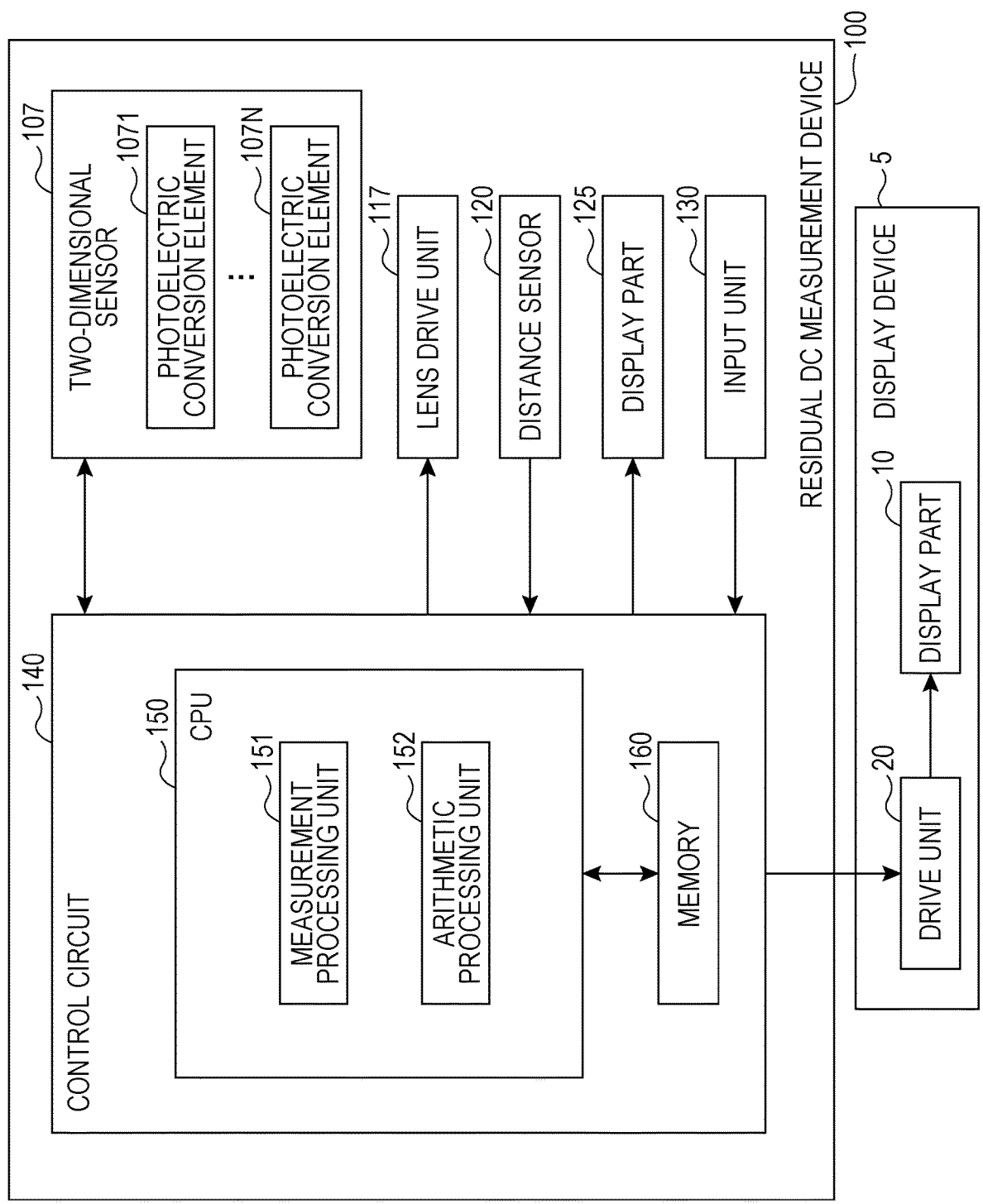
FIG. 1 is a block diagram schematically illustrating an electrical configuration example of a display device and a residual DC measurement device.
Figure 2:
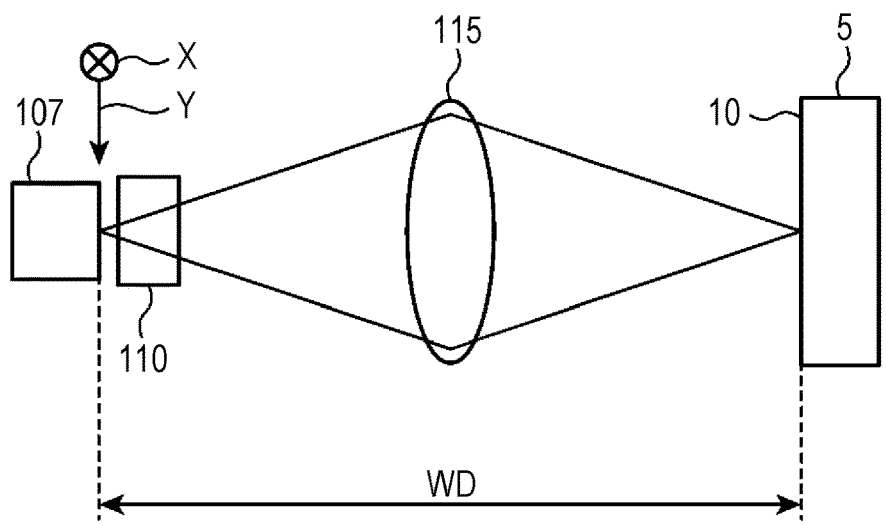
FIG. 2 is a diagram schematically illustrating an optical system of the residual DC measurement device.
Figure 3:
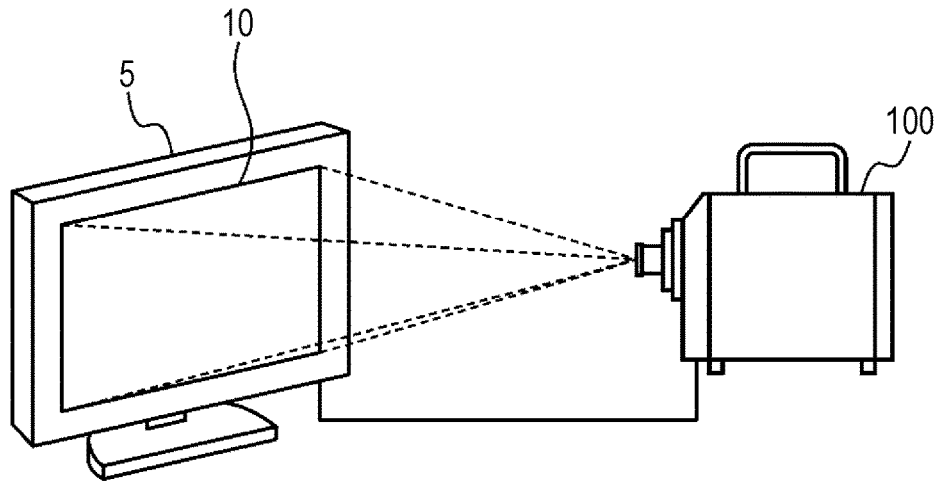
FIG. 3 is a diagram schematically illustrating a residual DC measurement state of the display device by the residual DC measurement device.

FIG. 1 is a block diagram schematically illustrating an electrical configuration example of a display device as a measurement target and a residual DC measurement device of the present embodiment. FIG. 2 is a diagram schematically illustrating an optical system of the residual DC measurement device of the present embodiment. FIG. 3 is a diagram schematically illustrating a residual DC measurement state of the display device as a measurement target by the residual DC measurement device of the present embodiment.

As illustrated in FIG. 3, a residual DC measurement device 100 of the present embodiment and a display device 5 as a measurement target are electrically connected. The residual DC measurement device 100 measures flickers at a plurality of predetermined measurement positions set in a predetermined two-dimensional region (for example, an entire display part 10) on a display part 10 of the display device 5 to obtain an index value representing the residual DC.

As illustrated in FIGS. 1 and 2, the residual DC measurement device 100 of the present embodiment includes a two-dimensional sensor 107, an optical filter 110, an optical system 115, a lens drive unit 117, a distance sensor 120, a display part 125, an input unit 130, and a control circuit 140. The control circuit 140 includes a central processing unit (CPU) 150, a memory 160, and a peripheral circuit (not illustrated). As illustrated in FIG. 1, the display device 5 includes a display part 10 (for example, a liquid crystal display in this embodiment) and a drive unit 20. The drive unit 20 includes, for example, an integrated circuit, a transistor, or the like, and displays a predetermined display image on the display part 10 on the basis of a control signal from the control circuit 140.

The memory 160 (corresponding to an example of a storage) of the residual DC measurement device 100 includes, for example, a read only memory (ROM), a random access memory (RAM), an electrically erasable and rewritable ROM (EEPROM), and the like. The memory 160 may include, for example, a hard disk drive (HDD). For example, the ROM of the memory 160 stores a control program (corresponding to an example of a residual DC measurement program) of the present embodiment for operating the CPU 150. The CPU 150 functions as a measurement processing unit 151 and an arithmetic processing unit 152 by operating according to the control program of the present embodiment stored in the memory 160. The functions of the measurement processing unit 151 and the arithmetic processing unit 152 will be described later.

The two-dimensional sensor 107 (corresponding to an example of a light receiver) includes a plurality of photoelectric conversion elements 1071 to 107N (for example, photodiodes) two-dimensionally arranged in a row direction X and a column direction Y (FIG. 2), and is electrically connected to the control circuit 140. The optical system 115 includes one or more lenses and forms an image of the display device 5 (display part 10) on a light receiving surface of the two-dimensional sensor 107. In the present embodiment, the optical filter 110 is disposed between the two-dimensional sensor 107 and the optical system 115. The lens drive unit 117 moves a lens for adjusting a measurement range of the optical system 115 in an optical axis direction of the optical system 115.

The photoelectric conversion elements 1071 to 107N of the two-dimensional sensor 107 each receive light from the measurement position on the display part 10 of the display device 5, which has passed through the optical system 115 and the optical filter 110, and output a light reception signal corresponding to the amount of received light to the control circuit 140. The two-dimensional sensor 107 is, for example, a complementary metal-oxide semiconductor (CMOS) image sensor.

The optical filter 110 has a spectral transmission characteristic that satisfies $$\begin{aligned}&\text{(spectral sensitivity characteristics of the photoelectric conversion elements } 1071 \text{ to } 107\text{N}) \times (\text{spectral transmission characteristic of the optical filter } 110) \\ &= (\text{spectral responsivity of the two-dimensional sensor } 107) \\ &= \text{standard relative luminosity } V(\lambda) \end{aligned} \quad \text{(Equation 1).}$$

The optical filter 110 is an absorption type or vapor deposition type filter, and is formed by a known method so as to have a spectral transmission characteristic that satisfies (Equation 1). Note that in FIG. 2, the optical filter 110 is disposed in front of the two-dimensional sensor 107, but may be disposed between the optical system 115 and the display device 5.

The distance sensor 120 is electrically connected to the control circuit 140, and is controlled by the measurement processing unit 151 to detect a work distance (WD) that is a distance between the display device 5 and the residual DC measurement device 100. The distance sensor 120 outputs the detected WD to the control circuit 140. The measurement processing unit 151 operates the lens drive unit 117 according to the WD detected by the distance sensor 120 to adjust the position or positions in the optical axis direction of one or more lenses constituting the optical system 115, thereby adjusting the measurement range (angle of view). The distance sensor 120 includes, for example, a laser distance sensor. The distance sensor 120 is not limited to the laser distance sensor, and may include another sensor capable of detecting the WD, such as an ultrasonic sensor or an infrared sensor.

In the present embodiment, as illustrated in FIG. 2, the WD is set to a distance along a horizontal direction between a surface of the display part 10 of the display device 5 and the light receiving surface of the two-dimensional sensor 107, but is not limited thereto. Alternatively, the WD may be set to a distance along the horizontal direction between the surface of the display part 10 of the display device 5 and a surface of a housing of the residual DC measurement device 100.

Note that, for example, in a case where the lens drive unit 117 is not provided and the optical system 115 having a fixed angle of view is used, the measurement processing unit 151 may cause the display part 125 to display a message prompting the user to move the housing of the residual DC measurement device 100 close to or away from the display device 5 according to the WD detected by the distance sensor 120.

The display part 125 includes, for example, a liquid crystal display panel. The display part 125 is controlled by the CPU 150 and displays, for example, a measurement result of the residual DC. Note that the display part 125 is not limited to the liquid crystal display panel, and may include another display panel such as an organic electroluminescence (EL) panel.

The input unit 130 includes an operation button operated by the user, and outputs an operation signal indicating an operation content of the user to the control circuit 140. The input unit 130 includes, for example, a measurement start button for instructing a start of measurement, a display time setting button for setting a display time of a predetermined display image, and the like. Note that, in a case where the display part 125 is a touch panel display, the touch panel display may also serve as the input unit 130 instead of the operation button.

Figure 4:
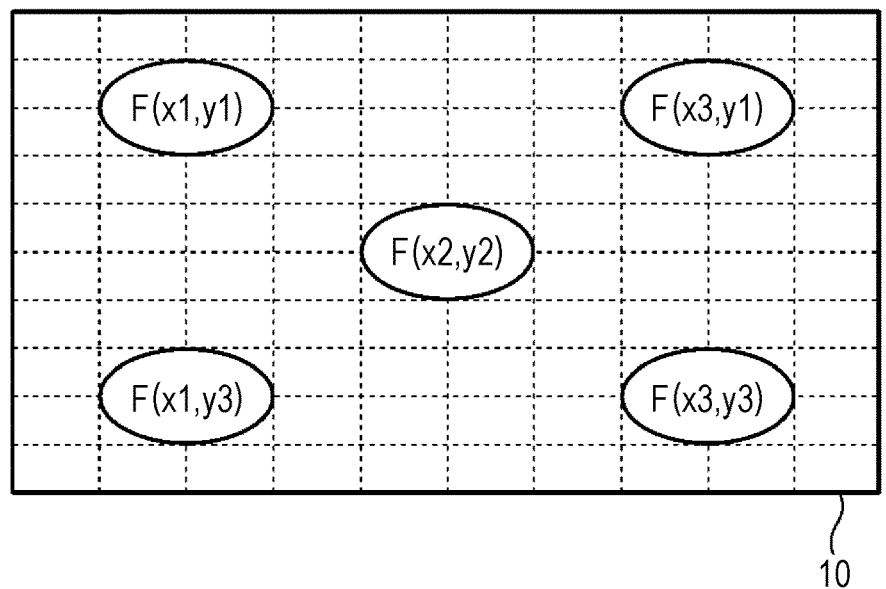
FIG. 4 is a diagram schematically illustrating a specific example of measurement positions on a display part.
Figure 5:
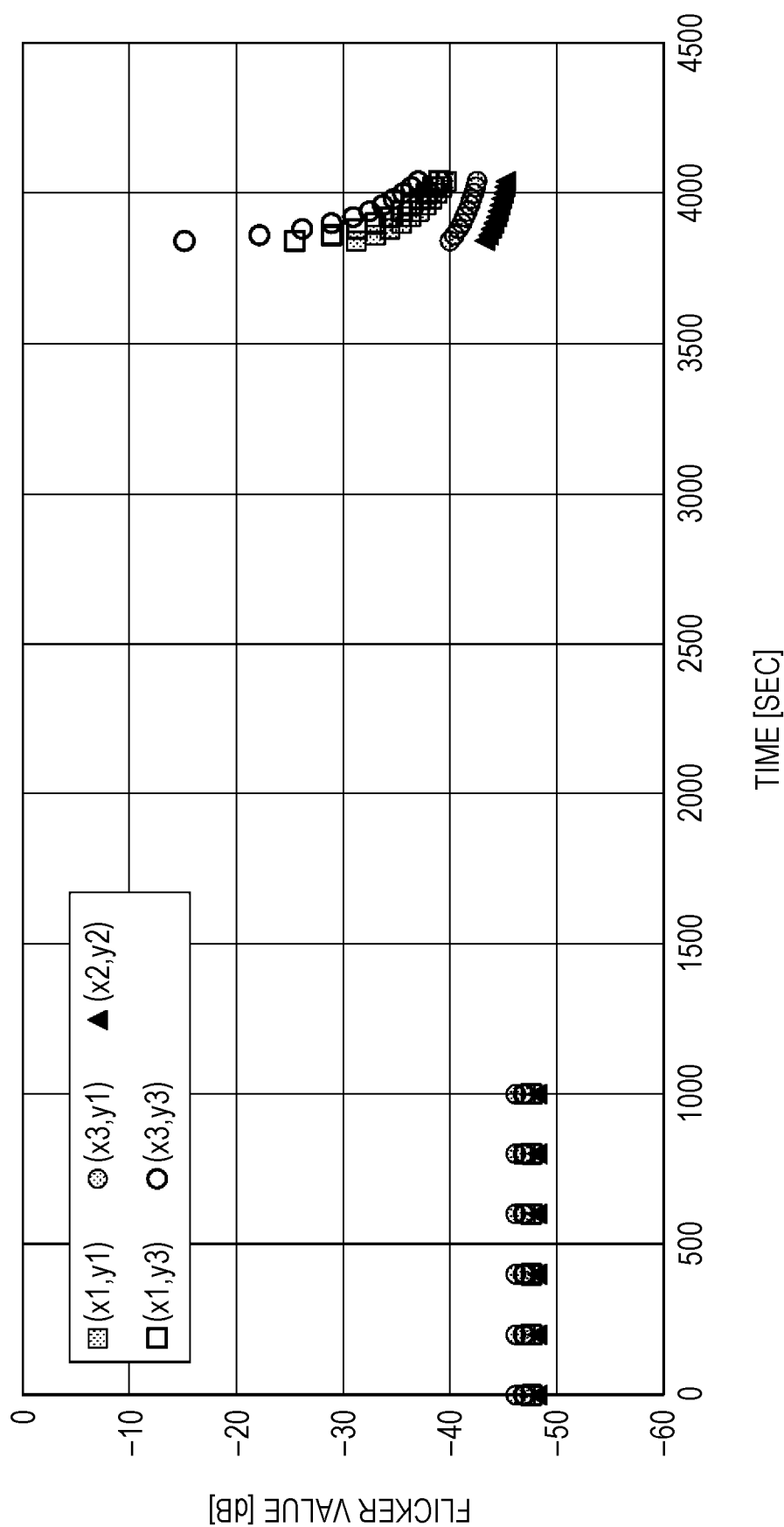
FIG. 5 is a diagram schematically illustrating a specific example of flicker values at the respective measurement positions illustrated in FIG. 4.
Figure 7:
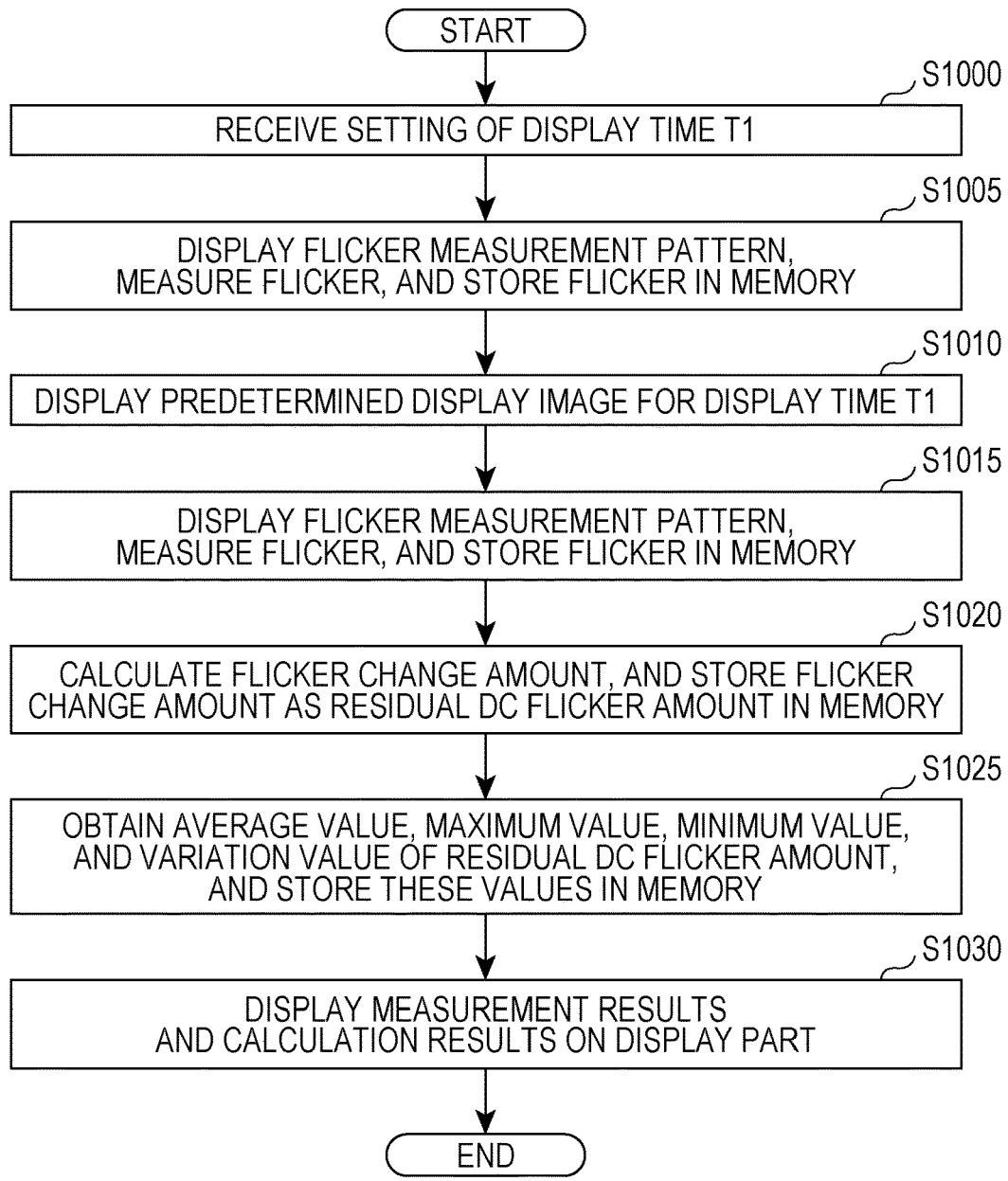
FIG. 7 is a flowchart schematically illustrating an operation procedure example of the residual DC measurement device.

FIG. 4 is a diagram schematically illustrating a specific example of measurement positions on the display part 10. FIG. 5 is a diagram schematically illustrating a specific example of flicker values at the respective measurement positions illustrated in FIG. 4. FIG. 6 is a diagram illustrating the flicker values and so on in FIG. 5 in a tabular form by the measurement positions. FIG. 7 is a flowchart schematically illustrating an operation procedure example of the residual DC measurement device. With reference to FIGS. 4 to 6, the functions of the measurement processing unit 151 and the arithmetic processing unit 152 will be described with reference to FIG. 7.

For example, when the start of measurement is instructed by the user using the measurement start button of the input unit 130, the operation of FIG. 7 is started. In step S1000, for example, when a display time T1 (in the present embodiment, for example, T1=2800 [sec] as illustrated in FIG. 4) is set by the user using the display time setting button of the input unit 130, the measurement processing unit 151 receives this setting and stores the set display time T1 in, for example, the RAM of the memory 160.

In step S1005 (corresponding to an example of an initial flicker value measurement step), the measurement processing unit 151 controls the drive unit 20 of the display device 5 to display, for example, a flicker measurement pattern in a checkered pattern (corresponding to an example of a flicker measurement image) on the display part 10, measures the flicker value in a predetermined procedure on the basis of the light reception signal output from the photoelectric conversion elements 1071 to 107N of the two-dimensional sensor 107, and stores the flicker value as an initial flicker value in association with each measurement position in, for example, the RAM of the memory 160. The measurement processing unit 151 measures, for example, the flicker value according to a contrast method, an electronic information technology industry association (JEITA) method, a measurement method defined by the International Electrotechnical Commission (IEC), or an ICDM standard defined by the International Committee for Display Metrology.

In the present embodiment, as illustrated in FIG. 4, flicker values are measured at five measurement positions F(x1, y1), F(x3, y1), F(x2, y2), F(x1, y3), and F(x3, y3). As illustrated in FIG. 5, the flicker measurement pattern is displayed on the display part 10 and the flicker value is measured from the measurement start time point to the 1000 [second] elapsed time point. When rounded off to the first decimal place, the initial flicker values FVi(xi, yj) at respective measurement positions measured by the measurement processing unit 151 are −47, −46, −48, −48, and −47 [dB] as illustrated in FIG. 6. The initial flicker values FVi (xi, yj) are stored in the memory 160 in association with the respective measurement positions.

In step S1010 (corresponding to an example of the display control step) of FIG. 7, the measurement processing unit 151 controls the drive unit 20 of the display device 5 to display a predetermined display image on the display part 10 for the display time T1. The predetermined display image may be, for example, a white image displayed on the entire display part 10. Alternatively, the predetermined display image may be a fatigue pattern in which the white region is included in the black region of the background, for example, as illustrated in FIG. 8. However, in the case of the fatigue pattern as illustrated in FIG. 8, it is preferable that the fatigue pattern is such that the five measurement positions F(x1, y1), F(x3, y1), F(x2, y2), F(x1, y3), and F(x3, y3) are located in the white region. In the present embodiment, as illustrated in FIG. 5, the display time T1=2800 [sec].

In step S1015 (corresponding to an example of the posterior flicker value measurement step) of FIG. 7, the measurement processing unit 151 controls the drive unit 20 of the display device 5 to display the same flicker measurement pattern as that in step S1005 on the display part 10, measures the flicker value in the same procedure as in step S1005 on the basis of the light reception signal output from the photoelectric conversion elements 1071 to 107N of the two-dimensional sensor 107, and stores the flicker value as a posterior flicker value in association with each measurement position, for example, in the RAM of the memory 160.

When rounded off to the first decimal place, the posterior flicker values FVa(xi, yj) at respective measurement positions measured by the measurement processing unit 151 are −31, −40, −43, −25, and −15 [dB] as illustrated in FIG. 6. The posterior flicker values FVa(xi, yj) are stored in the memory 160 in association with the respective measurement positions. Note that FIG. 5 also illustrates flicker values measured thereafter. However, in the present embodiment, the flicker value first measured after the display time T1 elapses is stored in the memory 160 as the posterior flicker value.

In step S1020 (corresponding to an example of the arithmetic processing step) of FIG. 7, the arithmetic processing unit 152 calculates a difference obtained by subtracting the initial flicker value from the posterior flicker value as the flicker change amount. That is, the arithmetic processing unit 152 calculates the flicker change amount FD(xi, yj) as $FD(xi, yj)$ $=FVa(xi,yj)-FVi(xi,yj).$ The arithmetic processing unit 152 stores the calculated flicker change amount FD(xi, yj) as a residual DC flicker amount in, for example, the RAM of the memory 160.

In the present embodiment, the residual DC flicker amount that is the flicker change amount FD(xi, yj) at each measurement position calculated by the arithmetic processing unit 152 is 16, 6, 5, 22, or 32 [dB], as illustrated in FIG. 6 when rounded off to the first decimal place. The residual DC flicker amount is stored in the memory 160 in association with each measurement position.

The initial flicker value FVi(xi, yj), since it is a flicker value measured before the predetermined display image is displayed, is not affected by the residual DC. On the other hand, the posterior flicker value FVa(xi, yj), since it is a flicker value measured after the predetermined display image is displayed for the display time T1, is affected by the residual DC. Therefore, it is considered that the flicker change amount FD(xi, yj) obtained by subtracting the initial flicker value FVi(xi, yj) from the posterior flicker value FVa(xi, yj) can be used as an index value representing the residual DC. Accordingly, in the present embodiment, the flicker change amount FD(xi, yj) is stored in the memory 160 as the residual DC flicker amount.

In step S1025 of FIG. 7, the arithmetic processing unit 152 obtains an average value, a maximum value, a minimum value, and a variation value of the flicker change amount FD(xi, yj) at all the measurement positions (xi, yj), and stores the average value, the maximum value, the minimum value, and the variation value in, for example, the RAM of the memory 160. In step S1030, the arithmetic processing unit 152 causes the display part 125 to display the measurement results and the calculation results illustrated in FIG. 6, for example, and ends the operation of FIG. 7.

In the examples of FIGS. 5 and 6, when the average value FDave is rounded off to the first decimal place, FDave $=(16+6+5+22+32)/5$ $=16.$ The average value FDave of the flicker change amount FD(xi, yj) is considered to be a value representing the residual DC in the entire display part 10 of the display device 5.

In the examples of FIGS. 5 and 6, a maximum value FDmax is FDmax=32. In the examples of FIGS. 5 and 6, a minimum value FDmin is FDmin=5. In the examples of FIGS. 5 and 6, a variation value FDdif is FDdif $=FDmax-FDmin$ $=27.$ In the results illustrated in FIG. 6, the flicker change amount at the measurement position F(x3, y3) greatly changes to 32 [dB], and it can be seen that the largest residual DC is generated among the five measurement positions. On the other hand, at the measurement position F(x2, y2), since the flicker change amount is as small as 5 [dB], it can be seen that small residual DC is generated. Since the average value of the residual DC flicker amounts at the respective measurement positions is 16 [dB] and the variation value is 27 [dB], it can also be seen that the generation amount of the residual DC greatly differs depending on the measurement position.

As described above, in the present embodiment, the flicker change amount is obtained by subtracting the initial flicker value before display from the posterior flicker value after the predetermined display image is displayed on the display part 10 for the display time T1 is obtained. Since the posterior flicker value is affected by the residual DC and the initial flicker value is not affected by the residual DC, the flicker change amount can be used as an index value representing the residual DC. Therefore, with the residual DC measurement device 100 of the present embodiment, it is possible to measure the residual DC even in the display device 5 to which the wiring cannot be connected without disassembling. That is, when the residual DC measurement device 100 of the present embodiment is used, for example, in an inspection process in a factory where the display device 5 is manufactured, the residual DC of the display device 5 can be measured in a state where assembly is almost completed.

In the present embodiment, the residual DC flicker amount at a plurality of (five in the present embodiment) measurement positions F(xi, yi) is obtained using the two-dimensional sensors 107 including the plurality of photo-electric conversion elements 1071 to 107N, which are two-dimensionally arranged. Accordingly, according to the present embodiment, it is possible to grasp the spatial distribution of the residual DC in the display device 5.

In the present embodiment, the measurement results and the calculation results illustrated in FIG. 6 are displayed on the display part 125. Thus, the display part 125 displays that the maximum value of the flicker change amount (residual DC flicker amount) is the measurement position F(x3, y3). Consequently, the user can grasp the position to be improved in order to reduce the flicker value.

In the present embodiment, the display part 125 displays that the minimum value of the flicker change amount (residual DC flicker amount) is the measurement position F(x2, y2) in addition to the maximum value of the flicker change amount (residual DC flicker amount). Thus, the user can grasp the position to be improved in order to reduce the variation in the flicker value.

In the present embodiment, when the display time T1 is set by the user using the display time setting button of the input unit 130, the measurement processing unit 151 receives this setting and stores the set display time T1 in, for example, the RAM of the memory 160. Therefore, according to the present embodiment, the user can set the desired display time T1 according to the liquid crystal material used for the display device 5. For example, in a case of a liquid crystal material in which residual DC is easily generated, when the display time T1 is set to a short value, the measurement time of the residual DC can be shortened. On the other hand, in a case of a liquid crystal material in which the residual DC is not easily generated, when the display time T1 is set to a long value, the residual DC can be more reliably measured.

(Others)

(1) In the above embodiment, a difference between the maximum value FDmax and the minimum value FDmin of the flicker change amount FD(xi, yj) is calculated as the variation value FDdif. Alternatively, a variance or standard deviation of the flicker change amount FD(xi, yj) may be calculated as the variation value. However, as in the above embodiment, the difference between the maximum value and the minimum value can more easily calculate the variation value in a short time.

(2) In the above embodiment, for example, the ROM of the memory 160 stores the control program of the above embodiment for operating the CPU 150, but the medium for storing the control program is not limited to the memory 160.

For example, the control program of the above embodiment may be stored in a removable recording medium such as a compact disc (CD)-ROM, a DVD, or a universal serial bus (USB) memory, and the residual DC measurement device 100 may have a configuration capable of reading the stored content of the removable recording medium.

(3) In the above embodiment, the optical filter 110 is provided, but the optical filter may not be provided. For example, depending on the colors displayed on the display part 10 of the display device 5, it may not be necessary to match the spectral responsivity of the two-dimensional sensor 107 with the standard relative visibility V(k), and in that case, the optical filter may not be provided.

(4) In the above embodiment, the residual DC measurement device 100 includes the control circuit 140 but is not limited thereto. For example, an external personal computer and the residual DC measurement device 100 may be configured to communicate with each other in a wireless or wired manner, and the personal computer may include the display part 125, the input unit 130, and the control circuit 140 instead of the residual DC measurement device 100. Even with such a configuration, similar effects to those of the above embodiment can be obtained. The configuration of the residual DC measurement device 100 can be simplified.

(5) In the above embodiment, the residual DC measurement device 100 is a device that measures flickers at a plurality of predetermined measurement positions set in a predetermined two-dimensional region in the display part 10 of the display device 5, but is not limited thereto. The residual DC measurement device may be a device that measures a flicker at a single measurement position on the display part 10 of the display device 5.

(6) In the above embodiment, the memory 160 may further store a relational expression representing the relationship between the residual DC and the flicker change amount in advance. The arithmetic processing unit 152 may obtain the residual DC from the flicker change amount and the relational expression. According to this embodiment, the residual DC in the display device 5 of the finished product can be obtained without disassembling the display device 5.

(7) In the above embodiment, the arithmetic processing unit 152 obtains the average value, the maximum value, and the minimum value of the flicker change amounts FD(xi, yi) at the plurality of measurement positions, but is not limited thereto. Any one of an average value, a maximum value, or a minimum value of the flicker change amount FD(xi, yi) may be obtained. Alternatively, instead of or in addition to the average value, the maximum value, and the minimum value of the flicker change amount FD(xi, yi), the most frequent value of the flicker change amount FD(xi, yi) may be obtained.

(8) In the above embodiment, the arithmetic processing unit 152 calculates the difference obtained by subtracting the initial flicker value from the posterior flicker value as the flicker change amount, but is not limited thereto. For example, the arithmetic processing unit 152 may calculate a quotient obtained by dividing the posterior flicker value by the initial flicker value as the flicker change amount.

As described above, according to each embodiment, it is possible to easily measure a value correlated with the residual DC even in the display device in which the wiring cannot be connected without disassembling.

The present specification discloses technologies of various aspects as described above, and main technologies thereof are summarized below.

A residual DC measurement device according to a first aspect is a residual DC measurement device for measuring residual DC of a display device, the residual DC measurement device including:

a light receiver that includes a photoelectric conversion element, receives light emitted from the display device, and outputs a light reception signal corresponding to an amount of received light;

a storage that stores data;

a measurement processing unit that causes the display device to display a flicker measurement image, acquires the light reception signal output from the light receiver while the flicker measurement image is displayed, measures a flicker value of the display device on the basis of the acquired light reception signal and stores the flicker value in the storage as an initial flicker value, subsequently causes the display device to display a predetermined display image for a predetermined display time, causes the display device to display the flicker measurement image again when the predetermined display time elapses, acquires the light reception signal output from the light receiver while the flicker measurement image is displayed, measures the flicker value of the display device on the basis of the acquired light reception signal, and stores the flicker value in the storage as a posterior flicker value; and an arithmetic processing unit that calculates a flicker change amount by calculating the posterior flicker value and the initial flicker value stored in the storage as an index value representing the residual DC.

A residual DC measurement method according to a second aspect is a residual DC measurement method for measuring residual DC of a display device, the method including:

an initial flicker value measurement step of causing the display device to display a flicker measurement image, acquiring a light reception signal that corresponds to an amount of received light and is output by a light receiver including a photoelectric conversion element by receiving light emitted from the display device while the flicker measurement image is displayed, measuring a flicker value of the display device on the basis of the acquired light reception signal, and storing the flicker value in a storage as an initial flicker value;

a display control step of causing the display device to display a predetermined display image instead of the flicker measurement image for a predetermined display time;

a posterior flicker value measurement step of causing the display device to display the flicker measurement image again instead of the predetermined display image when the predetermined display time elapses, acquiring the light reception signal output from the light receiver while the flicker measurement image is displayed, measuring the flicker value of the display device on the basis of the acquired light reception signal, and storing the flicker value in the storage as a posterior flicker value; and an arithmetic processing step of calculating a flicker change amount by calculating the posterior flicker value and the initial flicker value stored in the storage as an index value representing the residual DC.

A residual DC measurement program according to a third aspect causes a computer of a residual DC measurement device for measuring residual DC of a display device to execute:

an initial flicker value measurement step of causing the display device to display a flicker measurement image, acquiring a light reception signal that corresponds to an amount of received light and is output by a light receiver including a photoelectric conversion element by receiving light emitted from the display device while the flicker measurement image is displayed, measuring a flicker value of the display device on the basis of the acquired light reception signal, and storing the flicker value in a storage as an initial flicker value;

a display control step of causing the display device to display a predetermined display image instead of the flicker measurement image for a predetermined display time;

a posterior flicker value measurement step of causing the display device to display the flicker measurement image again instead of the predetermined display image when the predetermined display time elapses, acquiring the light reception signal output from the light receiver while the flicker measurement image is displayed, measuring the flicker value of the display device on the basis of the acquired light reception signal, and storing the flicker value in the storage as a posterior flicker value; and an arithmetic processing step of calculating a flicker change amount by calculating the posterior flicker value and the initial flicker value stored in the storage as an index value representing the residual DC.

In the first aspect, or the second aspect, or the third aspect, the flicker value of the display device is measured on the basis of the light reception signal output from the light receiver while the flicker measurement image is displayed, and is stored in the storage as the initial flicker value. After the predetermined display image is displayed for the predetermined display time, the flicker value of the display device is measured on the basis of the light reception signal output from the light receiver while the flicker measurement image is displayed, and is stored in the storage as the posterior flicker value. As an index value representing the residual DC, a flicker change amount is calculated by calculating the posterior flicker value and the initial flicker value.

Since the posterior flicker value is measured after the predetermined display image is displayed on the display device for the predetermined display time, the posterior flicker value is affected by the residual DC. On the other hand, the initial flicker value is not affected by the residual DC. Therefore, the flicker change amount represents the degree of influence of the residual DC, and thus can be used as an index value representing the residual DC. Consequently, according to the first aspect, or the second aspect, or the third aspect, it is possible to easily measure a value correlated with the residual DC even in the display device to which wiring cannot be connected without disassembling.

In the first aspect, for example, the light receiver may include a plurality of the photoelectric conversion elements and output a plurality of the light reception signals corresponding to the plurality of the photoelectric conversion elements, the plurality of the photoelectric conversion elements may be two-dimensionally arranged and each receive light emitted from different measurement positions from each other of the display device, the measurement processing unit may obtain the flicker value at each of the plurality of measurement positions on the basis of the plurality of the light reception signals, and store each of the obtained flicker values in the storage in association with the measurement positions, and the arithmetic processing unit may obtain the flicker change amount at each of the plurality of measurement positions as an index value representing the residual DC.

In this aspect, the flicker change amount at each of the plurality of measurement positions is obtained as the index value representing the residual DC. Therefore, according to this aspect, it is possible to grasp the spatial distribution of the residual DC in the display device.

In the first aspect, for example, the arithmetic processing unit may obtain at least one of an average value, a maximum value, a minimum value, or a most frequent value of the flicker change amounts at the plurality of measurement positions.

According to this aspect, since at least one of the average value, the maximum value, the minimum value, or the most frequent value of the flicker change amounts at the plurality of measurement positions is obtained, it is possible to obtain an evaluation value for evaluating the residual DC in the entire display device.

In the first aspect, for example, a display part is further provided, in which the arithmetic processing unit may obtain a maximum value and a minimum value of the flicker change amounts at the plurality of measurement positions, and display the maximum value, the minimum value, a measurement position of the maximum value, and a measurement position of the minimum value on the display part.

In this aspect, the maximum value and the minimum value of the flicker change amount at the plurality of measurement positions and each measurement position thereof are displayed on the display part. Therefore, according to this aspect, it is possible to grasp the maximum and minimum positions of a variation in the residual DC in the display device.

In the first aspect, for example, a display part is further provided, in which the arithmetic processing unit may obtain a variation value representing a variation in the flicker change amounts on the basis of the flicker change amounts at the plurality of measurement positions and display the variation value on the display part.

In this aspect, the variation value representing a variation in the flicker change amounts is obtained on the basis of the flicker change amounts at the plurality of measurement positions and displayed on the display part. Therefore, according to this aspect, the degree of variation of the residual DC in the display device can be grasped. The variation value may be a variance or standard deviation of the flicker change amount at the plurality of measurement positions. Alternatively, the variation value may be a difference between the maximum value and the minimum value of the flicker change amount at the plurality of measurement positions.

In the first aspect, for example, the storage may store a relational expression representing a relationship between the residual DC and the flicker change amount in advance, and the arithmetic processing unit may obtain the residual DC from the flicker change amount and the relational expression.

In this aspect, the residual DC is obtained from the obtained flicker change amount and the relational expression representing the relationship between the residual DC and the flicker change amount. Therefore, according to this aspect, the residual DC can be obtained even in a display device to which wiring cannot be connected without disassembly.

In the first aspect, for example, the arithmetic processing unit may calculate, as the flicker change amount, a difference obtained by subtracting the initial flicker value from the posterior flicker value or a quotient obtained by dividing the posterior flicker value by the initial flicker value. According to this aspect, the flicker change amount can be calculated by simple calculation of subtraction or division.

Although embodiments of the present invention have been illustrated and described in detail, they are merely illustrations and examples and are not limitations. The scope of the invention should be construed by the wording of the accompanying claims The entire disclosure of Japanese Patent Application No. 2019-045577, filed on Mar. 13, 2019, is incorporated herein by reference in its entirety.

INDUSTRIAL APPLICABILITY

The residual DC measurement device, the residual DC measurement method, and the residual DC measurement program of the present disclosure are used in a device for measuring residual DC of a display device.

The invention claimed is:

1. A residual direct current (DC) measurement device for measuring residual DC of a display device, the residual DC measurement device comprising:
a light receiver that includes a plurality of photoelectric conversion elements which is two-dimensionally arranged and each receives light emitted from different measurement positions from each other of the display device, and outputs a plurality of light reception signals corresponding to the plurality of the photoelectric conversion elements, each of the plurality of light reception signals corresponding to an amount of received light at a respective one of the plurality of photoelectric conversion elements;
a storage that stores data; and
a hardware processor that:
causes the display device to display a flicker measurement image, acquires the plurality of light reception signals output from the light receiver while the flicker measurement image is displayed, measures a flicker value of the display device at each of the plurality of measurement positions on the basis of the plurality of the acquired light reception signals and stores each of the flicker values in the storage in association with the measurement positions as an initial flicker value, subsequently causes the display device to display a predetermined display image for a predetermined display time, causes the display device to display the flicker measurement image again when the predetermined display time elapses, acquires the plurality of light reception signals output from the light receiver while the flicker measurement image is displayed, measures the flicker value of the display device at each of the plurality of measurement positions on the basis of the plurality of the acquired light reception signals, and stores each of the flicker values in the storage in association with the measurement positions as a posterior flicker value; and
calculates a flicker change amount at each of the plurality of measurement positions by calculating the posterior flicker value and the initial flicker value stored in the storage as an index value representing the residual DC.

2. The residual DC measurement device according to claim 1, wherein
the hardware processor obtains at least one of an average value, a maximum value, a minimum value, or a most frequent value of the flicker change amounts at the plurality of measurement positions.

3. The residual DC measurement device according to claim 1, further comprising a display part, wherein
the hardware processor obtains a maximum value and a minimum value of the flicker change amounts at the plurality of measurement positions, and displays the maximum value, the minimum value, a measurement position of the maximum value, and a measurement position of the minimum value on the display part.

4. The residual DC measurement device according to claim 1, further comprising a display part, wherein
the hardware processor obtains a variation value representing a variation in the flicker change amounts on the basis of the flicker change amounts at the plurality of measurement positions and displays the variation value on the display part.

5. The residual DC measurement device according to claim 1, wherein
the storage stores a relational expression representing a relationship between the residual DC and the flicker change amount in advance, and
the hardware processor obtains the residual DC from the flicker change amount and the relational expression.

6. The residual DC measurement device according to claim 1, wherein
the hardware processor calculates, as the flicker change amount, a difference obtained by subtracting the initial flicker value from the posterior flicker value or a quotient obtained by dividing the posterior flicker value by the initial flicker value.

7. A residual direct current (DC) measurement method for measuring residual DC of a display device, the method comprising:
causing the display device to display a flicker measurement image, acquiring a plurality of light reception signals from a light receiver, the light receiver including a plurality of photoelectric conversion elements which is two-dimensionally arranged and each receives light emitted from different measurement positions from each other of the display device, and outputs the plurality of light reception signals corresponding to the plurality of the photoelectric conversion elements, each of the plurality of light reception signals corresponding to an amount of received light at a respective one of the plurality of photoelectric conversion elements while the flicker measurement image is displayed, measuring a flicker value of the display device at each of the plurality of measurement positions on the basis of the plurality of the acquired light reception signals, and storing each of the flicker values in a storage in association with the measurement positions as an initial flicker value;

causing the display device to display a predetermined display image instead of the flicker measurement image for a predetermined display time;

causing the display device to display the flicker measurement image again instead of the predetermined display image when the predetermined display time elapses, acquiring the plurality of light reception signals output from the light receiver while the flicker measurement image is displayed, measuring the flicker value of the display device at each of the plurality of measurement positions on the basis of the plurality of the acquired light reception signals, and storing each of the flicker values in the storage in association with the measurement positions as a posterior flicker value; and calculating a flicker change amount at each of the plurality of measurement positions by calculating the initial flicker value and the posterior flicker value stored in the storage as an index value representing the residual DC.

8. A non-transitory recording medium storing a computer readable residual direct current (DC) measurement program for causing a computer of a residual DC measurement device for measuring residual DC of a display device to execute:

causing the display device to display a flicker measurement image, acquiring a plurality of light reception signals from a light receiver, the light receiver including a plurality of photoelectric conversion elements which is two-dimensionally arranged and each receives light emitted from different measurement positions from each other of the display device, and outputs the plurality of light reception signals corresponding to the plurality of the photoelectric conversion elements, each of the plurality of light reception signals corresponding to an amount of received light at a respective one of the plurality of photoelectric conversion elements while the flicker measurement image is displayed, measuring a flicker value of the display device at each of the plurality of measurement positions on the basis of the plurality of the acquired light reception signals, and storing each of the flicker values in a storage in association with the measurement positions as an initial flicker value;

causing the display device to display a predetermined display image instead of the flicker measurement image for a predetermined display time;

causing the display device to display the flicker measurement image again instead of the predetermined display image when the predetermined display time elapses, acquiring the plurality of light reception signals output from the light receiver while the flicker measurement image is displayed, measuring the flicker value of the display device at each of the plurality of measurement positions on the basis of the plurality of the acquired light reception signals, and storing each of the flicker values in the storage in association with the measurement positions as a posterior flicker value; and calculating a flicker change amount at each of the plurality of measurement positions by calculating the initial flicker value and the posterior flicker value stored in the storage as an index value representing the residual DC.

9. The residual DC measurement device according to claim 2, further comprising a display part, wherein
the hardware processor obtains a maximum value and a minimum value of the flicker change amounts at the plurality of measurement positions, and displays the maximum value, the minimum value, a measurement position of the maximum value, and a measurement position of the minimum value on the display part.

10. The residual DC measurement device according to claim 2, further comprising a display part, wherein
the hardware processor obtains a variation value representing a variation in the flicker change amounts on the basis of the flicker change amounts at the plurality of measurement positions and displays the variation value on the display part.

11. The residual DC measurement device according to claim 2, wherein
the storage stores a relational expression representing a relationship between the residual DC and the flicker change amount in advance, and
the hardware processor obtains the residual DC from the flicker change amount and the relational expression.

12. The residual DC measurement device according to claim 2, wherein
the hardware processor calculates, as the flicker change amount, a difference obtained by subtracting the initial flicker value from the posterior flicker value or a quotient obtained by dividing the posterior flicker value by the initial flicker value.

13. The residual DC measurement device according to claim 3, further comprising a display part, wherein
the hardware processor obtains a variation value representing a variation in the flicker change amounts on the basis of the flicker change amounts at the plurality of measurement positions and displays the variation value on the display part.

14. The residual DC measurement device according to claim 3, wherein
the storage stores a relational expression representing a relationship between the residual DC and the flicker change amount in advance, and
the hardware processor obtains the residual DC from the flicker change amount and the relational expression.

15. The residual DC measurement device according to claim 3, wherein
the hardware processor calculates, as the flicker change amount, a difference obtained by subtracting the initial flicker value from the posterior flicker value or a quotient obtained by dividing the posterior flicker value by the initial flicker value.

16. The residual DC measurement device according to claim 4, wherein
the storage stores a relational expression representing a relationship between the residual DC and the flicker change amount in advance, and
the hardware processor obtains the residual DC from the flicker change amount and the relational expression.

17. The residual DC measurement device according to claim 4, wherein
the hardware processor calculates, as the flicker change amount, a difference obtained by subtracting the initial flicker value from the posterior flicker value or a quotient obtained by dividing the posterior flicker value by the initial flicker value.

18. The residual DC measurement method according to claim 7, wherein
the calculating of the flicker change amount includes subtracting the initial flicker value from the posterior flicker value.

19. The non-transitory recording medium according to claim 8, wherein the calculating of the flicker change amount includes subtracting the initial flicker value from the posterior flicker value.

\* \* \* \* \*